UNITED STATES PATENT OFFICE 2,358,877

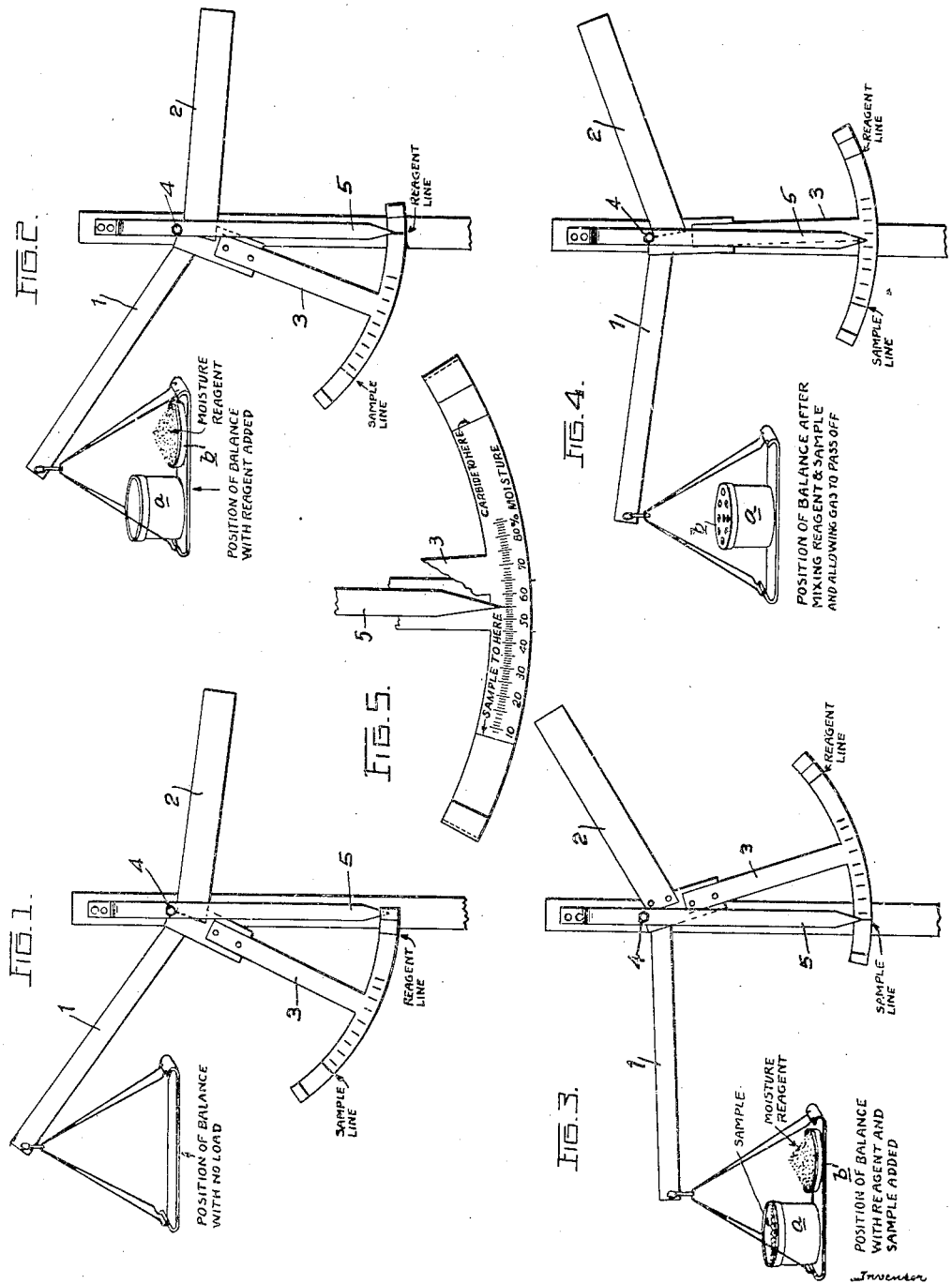

WEIGHING SCALE

Robert Quinn Parks, Columbus, Ohio, assignor to The Ohio State University Research Foundation, Columbus, Ohio, a corporation of Ohio Original application December 16, 1940, Serial No. 370,334. Divided and this application May 7, 1941, Serial No. 392,315

1 Claim. (Cl. 265—61)

The present invention relates to apparatus for obtaining moisture determinations in small grains, corn, hay, silage, and forage materials, such as legumes, grasses, and legume-grass mixtures, and more especially to an improved weighing scale for use in these determinations.

The primary object of the invention is to provide inexpensive apparatus for the rapid determination of moisture in small grains, corn, hay and silage materials and particularly to provide such an apparatus which an average farmer can readily operate and obtain at least a fairly close approximation of the amount of moisture in his staple materials. The present invention is directed more especially to an improved form of scale balance for carrying out this primary object. Heretofore when weighing samples of materials and using the calcium carbide method, it has been customary to employ only the ordinary forms of scale balances and to consult charts or graphs, furnished by the manufacturer of the scale balance, to translate the weight determinations of the sample or the reagent and the loss in weight after the reaction into moisture percentages. This is a very impractical scheme, particularly when the apparatus is being employed by farmers, as obviously it necessitates that the farmer have at hand all of the necessary charts, graphs, etc.

A more particular object is to provide an improved form of scale balance in which the moisture percentages may be read directly from the balance so that no accompanying charts or graphs, calculations, etc. are necessary and the farmer can see at a glance, from the reading on the scale, the exact percentage of moisture in the silage sample being tested.

Another object is to provide an improved form of scale balance which has its greatest sensitivity over the weight range which indicates the loss in weight of the sample after being treated by the chemical reagent. It will be understood that this loss in weight brought about by the chemical reaction is quite small compared with the weight of the sample, and even smaller than the combined weights of the sample and the chemical agent. The loss in weight must, therefore, be measured very accurately and for that reason it is desirable that the scale balance shall have its greatest sensitivity over the weight range in which the loss of weight is indicated by the balance.

The above objects are carried out, in brief, by providing a scale on the balance which has marks thereon to indicate the proper weights of the reagent and sample, and the distance between these two marks is calibrated directly into moisture percentages. The arrangement of the arms of the balance is such that when the balance is indicating loss of weight the arm carrying the scale pan assumes a substantially horizontal position in order to provide the maximum lever effect at this time, and thus to give optimum sensitivity.

The invention will be better understood when reference is made to the following description and the accompanying drawing:

In the drawing:

Figures 1 to 4 represent by diagram, four steps in the use of a specially designed scale for weighing the chemical reaction constituents accurately.

Figure 5 is a view of the index and the scale pointer of a weighing device employed in making the moisture determinations.

The determination is based on the relationship between the original moisture content of plant tissue and loss in weight when the sample is mixed with an excess of calcium carbide. The calcium carbide reacts with water according to the following equation:

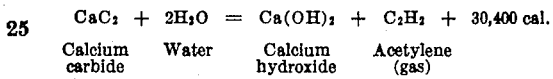

$$CaC_2 + 2H_2O = Ca(OH)_2 + C_2H_2 + 30{,}400 \text{ cal.}$$

Calcium carbide    Water    Calcium hydroxide    Acetylene (gas)

in which 36 grams of water react to give 26 grams of acetylene gas and 30,400 calories of heat. The water taking part in this reaction may be in liquid or vapor form, or in a mixture with other chemicals, such as water in plant sap.

When an excess of calcium carbide is added to a given weight of plant material and mixed, a loss of weight occurs which can be used as an index of the percentage moisture of the original sample.

A satisfactory method of carrying out this carbide reaction is found to be in a seamless tin container $a$, 3¾ inches in diameter and 2½ inches deep. Nine holes (½ inch in diameter) are drilled in the top $b$, and a coarse filter paper is glued inside the lid. The purpose of the filter paper is to prevent loss of powdered carbide due to convection currents, and at the same time allow ready escape of the acetylene gas formed. An excess of $CaC_2$ is placed in the lid and 30 grams of plant material weighed into the bottom half of the container. After obtaining the total weight (the lid with the carbide plus the container and its contents), the carbide is poured from the lid into the container. After placing the lid firmly in place, the container is alternately shaken and weighed until further loss in weight has ceased.

Although this method may be used with any size of plant sample, and on any suitable scale or balance set, it is deemed necessary, if the method is to be of greatest practical value, to provide a balance which will read directly in percentage moisture, will be sufficiently sensitive, and yet will be durable enough for field and farm use. Figures 1 to 5 show in operation a scale balance which is the outgrowth of this phase of the development.

The essential features of this balance are two arms 1, 2 (one for the pan and container, the other a counterpoise) which both point upward, and meet at an angle of approximately 150°; and a third arm 3, or ballast, which controls the extent of swing, without affecting the sensitivity through the range being considered. The arms pivot on a knife edge indicated at 4, made from a tool steel bolt. The arm structure 1, 2 and 3 may be arrested by stops at both ends of the scale to prevent excess swing and to hold the balance at rest while the container and part of the carbide are being added. Deflection begins when all but about 10 grams of the carbide has been added.

In order to determine the magnitude of possible variations resulting from the use of the method and the balance, and to determine the personal error involved, several individuals were asked to make duplicate analysis of plant samples of varying moisture contents. The results of these determinations are contained in the following table.

*Extent of variations in results, including personal error*

| Operator | Moisture content determined | Average of two determinations | Moisture content (by oven) | Difference in moisture content |
|---|---|---|---|---|
| | Per cent | Per cent | Per cent | Per cent |
| A | 72<br>77 | 74.5 | 72.1 | 2.4 |
| B | 37<br>40 | 38.5 | 39.7 | 1.2 |
| C | 30<br>32 | 31.0 | 29.6 | 1.4 |
| D | 23<br>24 | 23.5 | 22.6 | 0.9 |

An examination of the scale illustrated in enlarged form in Figure 5 will show that the sample line is positioned at the left hand end of the scale and the reagent line at the other end of the scale, and the space between these two lines is calibrated in terms of percentage of moisture. In performing the moisture determinations it is only necessary for the farmer to pour enough moisture reagent, such as calcium carbide, into the top $b$ (Figure 2) as will cause the scale to be moved downwardly until the reagent line is directly under the pointer 5. The sample is then added to the empty container $a$ until the sample line comes directly under the pointer, as is indicated in Figure 3. The moisture reagent is then added to the sample in the container $a$ and the latter is shaken for a while to insure a thorough mix of these materials. After the resulting gas and/or heat is driven off the container $a$, together with the top, is again weighed as indicated in Figure 4, and the moisture content of the sample will be indicated directly under the pointer 5. There is no necessity for consulting charts, tables or graphs because all of the calculations have been translated into determinations which are marked on the index scale, so that the farmer can read these moisture percentages directly from the scale. Assuming that the farmer has added the proper amounts of reagent and sample according to the reagent and sample marks on the scale, the moisture percentages shown by the scale will be reasonably accurate.

It will be further noted, in comparing the successive positions of the scale pan arm 1 shown in Figures 2, 3 and 4, that the arm continues to approach a position, i. e. the horizontal position at which the greatest sensitivity in determining weight is obtained. It is apparent that when the arm 1 is exactly horizontal the scale pan and the weights added thereto are positioned at the greatest distance from the central uprights of the scale and therefore exert their greatest effect at the index. This arrangement of the arms is particularly useful in measuring relatively small differences of weight, as when for example, the weight of the combined moisture reagent and sample is measured before reaction, as shown in Figure 3, and the combined weight of these materials is again measured after the chemical reaction, as shown in Figure 4. The measurement of the loss of weight occurs when the arm 1 is in a substantially horizontal position so that the scale balance provides its greatest sensitivity of measurement at this point in the moisture determinations. It is, of course, not absolutely necessary that the various arms of the scale balance shall have the arrangement and position shown in these figures, but the point is made that when the arm 1 assumes a horizontal position at the time that the loss in weight is being indicated, such a scale offers greater accuracy of measurement than a scale in which the arm 1 is not in the horizontal position at this time.

It will be further noted that the arcuate scale is symmetrically disposed with respect to its arm 3, and that the scale is disconnected from either of the arms 1, 2. Furthermore, the scale is formed as an arc, the center of which is positioned at the knife edge 4. A scale of this shape and character offers the advantage of providing a uniform swinging retarding effect, regardless of the position of the arm 3. Consequently, the swing retardation provided by the index introduces very little error, if any, into the weight determinations since its effect is practically the same each time the weight is being measured.

It will be understood that I desire to comprehend within my invention such modifications as come within the scope of the claims and the invention.

This application is a division of my application Serial No. 370,334, filed December 16, 1940.

Having thus fully described my invention, what I claim as new and desire to secure by Letters Patent, is:

A scale balance for indicating the amount of moisture in a substance placed within a container comprising an upright support, a pair of arms which meet at an angle less than 180°, one of said arms being provided with a pan for receiving the container and a moisture reagent, and the other arm constituting a counterpoise, said balance also including a third arm which serves as a ballast for controlling the extent of the swing, said arms being rigidly connected together and pivoted to said upright support at a position where the first two mentioned arms meet, a pointer fixed to said upright support and extending in a substantially vertical plane, an arcuate member fixed to said third arm having calibrations adjacent one end thereof for cooperating with said pointer for indicating the amount of moisture reagent to be placed upon said pan, calibrations adjacent the other end of said arcuate member for cooperating with said pointer for indicating the amount of substance to be placed in the container positioned on said pan, and additional calibrations on said arcuate member for cooperating with said pointer for indicating the amount of moisture in said substance when said substance and said moisture reagent are mixed in the container, said third arm and said arcuate member fixed thereto being fixed to said first pair of arms adjacent to said pivot in a manner so that said third arm is in a substantially vertical plane when said additional calibrations on said arcuate member cooperate with said pointer for indicating the moisture content of said substance.

ROBERT QUINN PARKS.